United States Patent [19]

Kincel

[11] 4,208,784
[45] Jun. 24, 1980

[54] METHOD FOR PLACING AND SECURING MAGNETS IN A MOTOR HOUSING

[75] Inventor: Roger S. Kincel, Whittier, Calif.

[73] Assignee: BASF Aktiengesellschaft, Rheinland-Pfalz, Fed. Rep. of Germany

[21] Appl. No.: 940,026

[22] Filed: Sep. 6, 1978

[51] Int. Cl.² .................................. H02K 15/02
[52] U.S. Cl. .............................. 29/596; 310/42; 310/154; 310/266; 310/268
[58] Field of Search ............... 29/596; 310/268, 266, 310/154, 155, 89, 42

[56] References Cited

U.S. PATENT DOCUMENTS

| 3,555,651 | 1/1971 | Latussek et al. | 29/596 X |
| 3,845,339 | 10/1974 | Merkle et al. | 310/268 X |
| 4,031,610 | 6/1977 | Singh et al. | 29/596 X |

Primary Examiner—Carl E. Hall
Attorney, Agent, or Firm—Fulwider, Patton, Rieber, Lee & Utecht

[57] ABSTRACT

An improved technique for the assembly of motors of the type having a printed armature that rotates in a flat, annular air gap between a magnet assembly and a magnetic flux plate, wherein the size of the air gap is accurately maintained at preselected value. In one embodiment of the invention, a precision shim, having a thickness the same as the preselected air gap size, is placed on a flat work surface, the magnet assembly is placed on the shim, and a motor housing is placed over the magnet assembly and shim. An epoxy fill in the housing is compressed as the housing is pressed down over the magnet assembly until a reference surface on the housing contacts the work surface. In an alternate embodiment of the invention, an inner flux plate is formed to include a plurality of tines, so shaped and sized that, when the inner flux plate and the magnet assembly are bonded together and inserted in the housing, the tines provide for a force fit in the housing. The magnet assembly and inner flux plate are pressed into the housing by a press tool with lugs that project from a flat surface of the tool by a distance equal to the preselected size of the air gap.

9 Claims, 4 Drawing Figures

U.S. Patent
Jun. 24, 1980
4,208,784
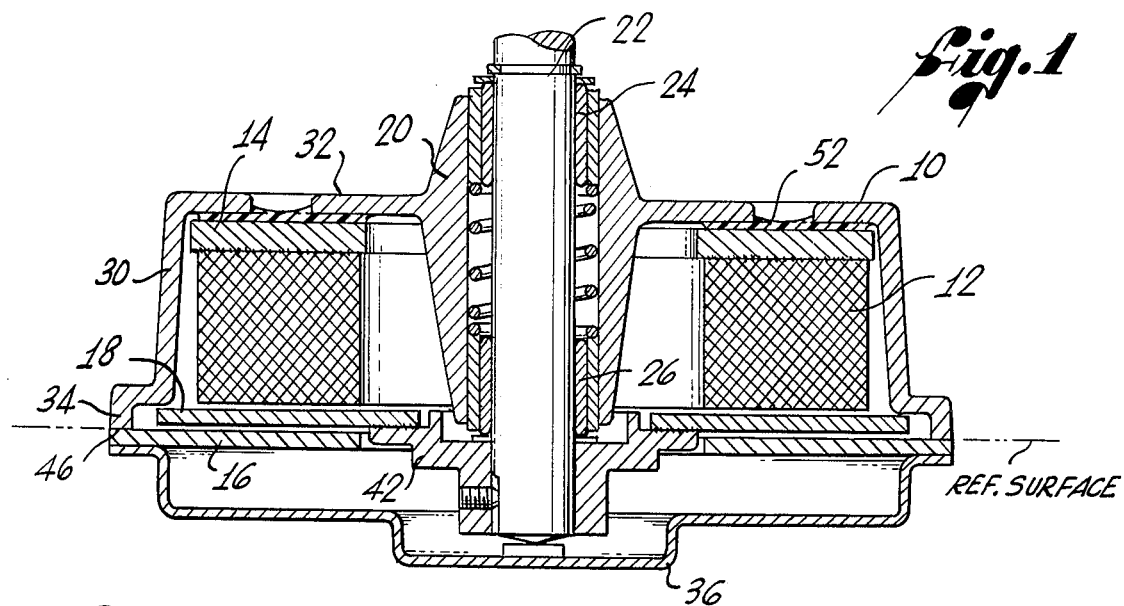
Fig. 1
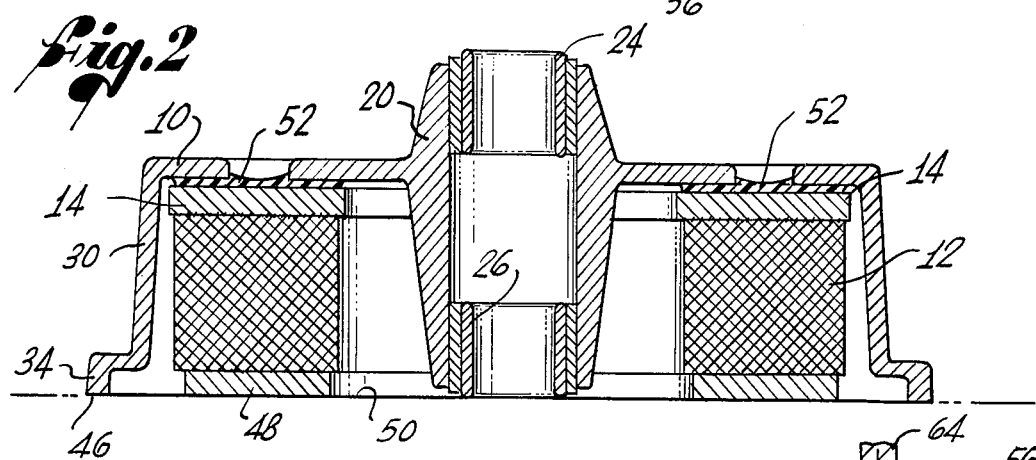
Fig. 2
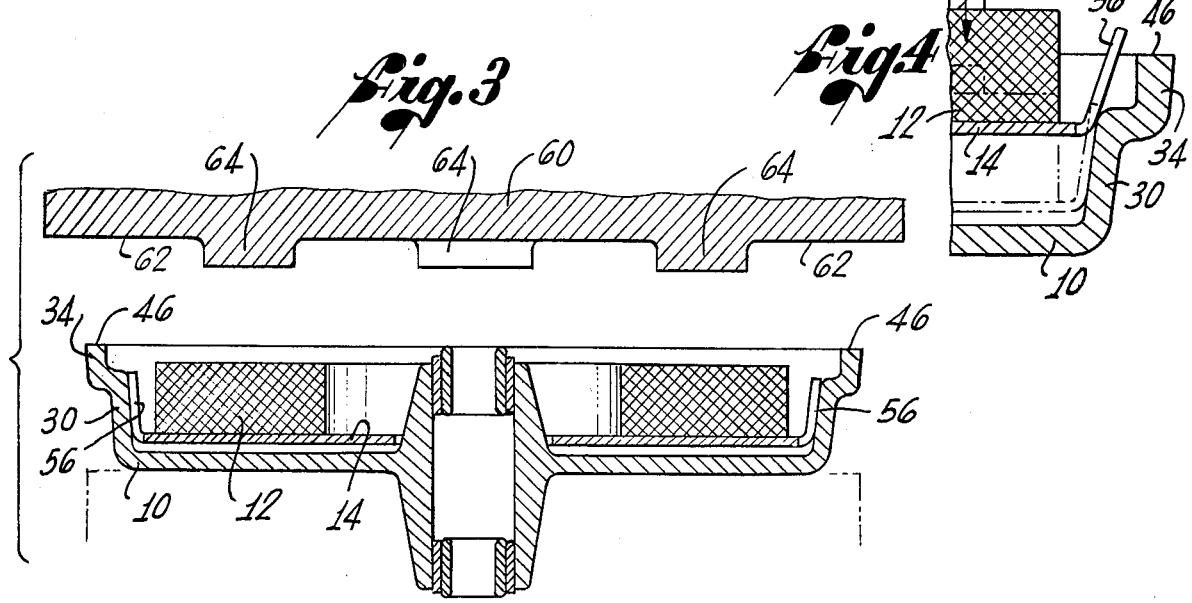
Fig. 3
Fig. 4

METHOD FOR PLACING AND SECURING MAGNETS IN A MOTOR HOUSING

BACKGROUND OF THE INVENTION

The present invention relates generally to the manufacture of small electric motors, and, more particularly, to the manufacture of motors known as printed motors, in which the motor armature takes the form of a disk fabricated with the use of printed circuit techniques.

The armature, and the armature conductors printed on it, rotate in a flat annular air gap in a plane perpendicular to the shaft of the motor. Many of the advantages of the motor are derived from the fact that the rotating portion contains no iron. In particular, the torque of the motor is generated smoothly without any "cogging" between preferred armature positions. The motor armature also has a very rapid response to changes in terminal voltage, because of its low inertia. Consequently, the printed motor is particularly useful in applications where speed control is critical, such as in servo motors, or as a drive motor for video tape recorders.

Basically, a printed motor comprises a generally cylindrical housing, of relatively short axial length, an array of field magnets arranged in an annular assembly within the housing, a disk-shaped armature, and two flux plates, one of which may be referred to as the inner flux plate and is mounted in the housing in contact with one coplanar face of the magnet assembly, and the other of which may be referred to as the outer flux plate and is spaced apart from the opposite face of the magnet assembly, to form an annular air gap. A magnetic circuit is thus formed by the magnets, the air gap, and the two flux plates, and the armature is mounted for rotation in the air gap. Unlike conventional motors, the printed motor has no separate commutator, but has brushes which bear directly on the printed armature.

A critical dimension in the printed motor is the axial length of the air gap in which the armature rotates. In the past, this dimension has been controlled as well as possible by machining the inside surface of the housing to a desired depth, and ensuring that the dimensions of the inner flux plate and the magnet assembly are accurately controlled, so that the axial length of the resulting air gap is also controlled as accurately as possible. However, control of these several dimensions gives rise to a cumulative error in the gap, especially over relatively long production runs, and the gap lengths may vary significantly from motor to motor. Since the gap length is determinative of the magnetic field strength in the gap, and, therefore, is also determinative of the performance characteristics of the motor, manufacturers must usually underrate their motors to be sure that all of the motors manufactured meet published performance specifications. Otherwise, a motor with an air gap greater than the design value would be unable to generate its specified maximum torque without exceeding a safe armature current level.

It will be appreciated from the foregoing that there is a need for a simple and convenient technique for accurately controlling the gap length of motors of the printed type. The present invention satisfies this need.

SUMMARY OF THE INVENTION

The present invention resides in a method for controlling the length of the air gap in which the motor armature rotates. Basically, and in general terms, the method of the invention includes the steps of forming a reference surface on the motor housing, inserting the magnet assembly in the housing, and securing the magnet assembly in the housing at a predetermined distance below the reference surface. In one preferred embodiment of the invention, the step of securing the magnet assembly in the housing includes placing a precision shim on a flat work surface, placing the magnet assembly and inner flux plate on the shim, placing an adhesive on the inner flux plate, and then moving the housing down over the magnet assembly and the inner flux plate until the the reference surface contacts the work surface. After the adhesive has set, the precision shim spacer can be removed, and a uniform gap thereby obtained when the outer flux plate is secured to the reference surface.

In another preferred embodiment of the invention, the inner flux plate is provided with a plurality of tines around its periphery, and the step of securing the magnet assembly in the housing includes inserting the magnet assembly and flux plate into the housing in such a manner that the tines yield inwardly during the assembly process, and form a force fit with the inside of the housing. As in the first-described embodiment of the invention, the desired spacing between the reference surface and the magnet assembly can be obtained by using a shim, and by assembling the entire motor assembly on a flat surface. Alternatively, a press can be used in conjunction with a press fixture having a base surface which contacts the reference surface of the housing, and having lugs projecting out from the base surface by a distance equal to the desired gap length. The lugs are located so as to contact only the magnet assembly, and to force it below the reference surface by the desired gap length. An adhesive may also be used between the tines and the interior surface of the housing, to supplement the force fit provided by the bendable tines.

It will be appreciated from the foregoing that the present invention provides a significant advance in manufacturing techniques for this type of motor. In particular, it allows the length of the air gap in the magnetic circuit of the motor to be controlled very accurately, even over long production runs. Other aspects and advantages of the invention will become apparent from the following more detailed description, taken in conjunction with the accompanying drawings.

BRIEF DESCRIPTION OF THE DRAWINGS

FIG. 1 is a sectional view of an assembled motor of the type with which the present invention is concerned;

FIG. 2 is a sectional view similar to FIG. 1, but showing how the magnet assembly is placed and secured in the motor housing in accordance with one embodiment of the invention, to obtain a desired air gap;

FIG. 3 is a sectional view of the motor showing how the magnet assembly is placed and secured in the motor housing in accordance with another embodiment of the invention; and FIG. 4 is a fragmentary sectional view showing the magnet assembly and inner flux plate in a partially assembled relationship with the motor housing.

DESCRIPTION OF THE PREFERRED EMBODIMENTS

As shown in the drawings for purposes of illustration, the present invention relates to a method of manufacture and assembly of printed motors. As shown in particular in FIG. 1, a motor of the type with which the present invention is concerned comprises a motor housing 10, an annular magnet assembly 12, an inner flux plate 14, an outer flux plate 16, and a disk-shaped armature 18. The housing 10 is generally cylindrical in shape, with a central hub 20 in which a shaft 22, is journaled in a pair of bearings 24 and 26. The housing 10 has a cylindrical sidewall 30, an integral, closed end wall 32, which is continuous except for a central portion where it merges with the hub 20, and has a peripheral lip 34 formed around the edge of the sidewall remote from the end wall.

The magnet assembly 12 is disposed annularly in the housing 10, and typically comprises several pairs of magnets of alternating polarity. The inner flux plate 14 is annular in shape, is of magnetic material, and is bonded to one coplanar face of the magnet assembly 12. The outer flux plate 16 is also of annular shape, is of magnetic material, and is secured to the lip 34 of the housing 10 to provide a return magnetic flux path. An end plate 36 is secured over the outer flux plate 16 to hold it in position. The housing 10 and the magnet assembly 12 are so dimensioned that there is an air gap between the magnet assembly and the outer flux plate 16. The motor armature 18 is a disk rotatable in the air gap, and is secured to a central hub 42 which, in turn, is secured to the shaft 22 of the motor for rotation in the bearings 24 and 26. The armature 18, which is not shown in detail, has armature conductors formed thereon by printed circuit techniques. These conductors extend in a direction inclined to the radial direction and are joined at their extremities with counterparts on the reverse side of the disk, by printed-through areas on the disk. The motor also includes brushes (not shown), which bear directly on the armature conductors to provide a commutation effect without the necessity of a separate commutator element.

As is well known, the total magnetic flux in which a direct-current motor armature rotates directly affects the performance characteristics of the motor. Specifically, the torque of a direct-current motor is proportional to the total flux if the current through the armature is constant. Also, the speed of the motor is inversely proportional to the total flux, if the armature voltage and current are held constant. It will also be appreciated that the total flux in the air gap between the magnet assembly 12 and the outer flux plate 16 is significantly affected by the length of the air gap, since the air gap forms the highest-reluctance portion of the magnetic circuit.

Accordingly, it will also be appreciated that it is extremely important that the length of the air gap be accurately controlled, in order to achieve uniformity of motor characteristics. In the past, the length of the air gap has been controlled only by accurately machining or otherwise forming the interior surface of the housing end wall 32 so that the distance between the machined portion of the housing and the outer edge of the housing lip 34 is determined as accurately as possible, and by accurately forming the inner flux plate 14 and the magnet assembly 12. However, the control of these several dimensions produces a cumulative error in the air gap distance between the magnet assembly 12 and the outer edge of the lip 34, and there are still significant variations from motor to motor in the total level of magnetic flux in the air gap. Of course, these variations in flux cause corresponding variations in performance characteristics. For example, if the total flux in the air gap in a particular motor is reduced by 10% below its design value, then the maximum torque output from the motor is also reduced by 10%, or, if the motor is loaded by a given torque, the armature current is increased by 10%, thereby increasing the likelihood of damage to the motor when operated at its rated maximum torque. The only way for manufacturers to avoid such problems is to downgrade the ratings or specifications of the motors to a level consistent with the largest air gap obtained in manufacture. If the air gap could be more closely controlled, manufacturers could upgrade their specifications and specify a higher output torque for a motor of given physical size.

In accordance with the invention, the magnet assembly 14 is secured in the motor housing 10 in such a manner that the air gap is uniformly maintained at a preselected value. More specifically, in one preferred embodiment of the invention, as illustrated in FIG. 2, a reference surface 46 is first machined or otherwise formed on the lip 34 of the housing, the reference surface being in a plane parallel with the air gap to be formed, and perpendicular to the axis of rotation of the shaft 22. The distance from the reference surface to the inner surface of the housing end wall 32 is selected such that, when the inside flux plate 14 and the magnet assembly 12 are placed in the housing 10, there is still substantial clearance between the housing and the inner flux plate.

The next step in the assembly process is to place a precision shim spacer 48 on a flat work surface 50. The precision shim spacer 48 is preferably annular in shape, but its shape is not critical, only its thickness, which must equal the preselected air gap size. Then the magnet assembly 12 is placed on the shim spacer 48, the inside flux plate 14 having been previously bonded, as by an adhesive, to one surface of the magnet assembly 12. Then an epoxy fill, indicated at 52, or a preformed epoxy layer, is positioned either inside the motor housing 10 or on top of the inside flux plate 14, and the housing is placed in position over the magnet assembly 12 and the precision shim spacer 48. The housing 10 is then pressed down towards the work surface 50 until the reference surface 46 of the housing makes uniform contact with the work surface 50, thereby compressing or thinning out the layer of epoxy fill 52. The epoxy fill is then allowed to set with the component parts in this position, and assembly of the motor is later completed by removing the shim spacer 48, mounting the shaft 22 and armature disk 18, and attaching the outer flux plate 16.

It will be apparent that, in spite of significant dimensional variations in the fabrication of the motor housing, the inner flux plate 14, and the magnet assembly 12, the length of the air gap will be maintained constant to a high degree of accuracy by means of the precision shim spacer 48. A tolerance of one thousandth of an inch or less is possible by means of this technique.

In accordance with another embodiment of the invention, the inside flux plate 14 includes a plurality of tines, indicated at 56, which extend both outwardly and axially around the magnet assembly 12 when the inside flux plate and the magnet assembly are secured together, as shown in FIGS. 3 and 4. The tines 56 are bent at such an angle and located at such a position that, when the inner flux plate 14 and magnet assembly 12 are placed in the housing 10, the tines contact the inner surface of the motor housing sidewall 30, in a force fit engagement. The magnet assembly 12 and inner flux plate 14 have then to be forced into the housing 10, and are held therein primarily by frictional forces between the tines and the housing.

As illustrated in FIG. 3, the magnet assembly 12 and inner flux plate 14 can be forced into the desired position in the housing 10 by means of a press fixture 60 which has a flat surface 62 for contacting the reference surface 46 of the housing, and has a plurality of lugs 64 depending from the flat surface of the fixture by a distance equal to the desired gap length. The lugs 64 are positioned around an annular area of the same size as the magnet assembly 12 and, when the press fixture 60 is forced downwardly into the housing 10, the magnet assembly 12 and the flux plate 14 are thereby forced into the housing and secured therein at a position determined by the depth of the lugs 64. An anaerobic adhesive can also be used between the outer surface of the tines 56 and the inner surface of the housing 10, to hold the assembly 12 more securely in the housing.

It will be appreciated that the two aforedescribed techniques for achieving the desired spacing of the gap can be used interchangeably with the two embodiments of the invention. In particular, the press fixture 60 could also be used with the embodiment of the invention that uses the epoxy fill 52 to secure the magnet assembly 12 in the housing 10, and, likewise the precision shim spacer 48 could be used in conjunction with the embodiment that requires the inner flux plate 14 to have peripheral tines 56.

It will be appreciated from the foregoing that the present invention represents a significant advance in manufacturing technique for motors of the printed circuit type. In particular, it provides motors with air gaps of which the size is controlled to a degree of precision not previously obtainable. Such uniformity of the air gaps results in a more predictable magnetic field strength and, consequently, more uniform performance characteristics. It will also be appreciated that, although specific embodiments of the invention have been described in detail for purposes of illustration, various changes may be made without departing from the spirit and scope of the invention. Accordingly, the invention is not to be limited except as by the appended claims.

I claim:

1. A method for placing magnets in a motor housing, said method comprising the steps of:
   forming a reference surface on the motor housing;
   inserting a magnet assembly into the housing until the magnet assembly is located at a preselected distance from the reference surface;
   securing the magnet assembly at the preselected distance from the reference surface; and
   securing an outer flux plate to the reference surface, to form a gap of a preselected size.

2. A method as set forth in claim 1, wherein said inserting step includes:
   placing a precision shim on a flat work surface;
   placing the magnet assembly on the shim; and
   placing the housing over the magnet assembly with the reference surface in contact with the work surface.

3. A method as set forth in claim 1, wherein said inserting step includes:
   pressing the magnet assembly into the housing with a tool having a first surface for contacting the reference surface and a second surface for contacting the magnet assembly, the first and second surfaces being spaced apart by the preselected distance.

4. A method as set forth in claim 1 or 2 or 3, wherein said step of securing the magnet assembly includes:
   placing an adhesive material in said housing;
   compressing the adhesive material during said inserting step; and
   allowing the adhesive material to set after said inserting step.

5. A method as set forth in claim 1 or 2 or 3, wherein said step of securing the magnet assembly includes:
   securing the magnet assembly to a plate prior to said inserting step; and
   force-fitting the plate in the housing during said inserting step; whereby the plate and the magnet assembly are held in place by friction forces between portions of the plate and the housing.

6. A method of assembling a motor having a housing, a magnet assembly, and at least one magnetic flux plate, said method comprising the steps of:
   forming a reference surface on an open end of the housing;
   placing a precision shim of a preselected thickness on a flat work surface;
   securing the magnet assembly and flux plate together;
   placing the magnet assembly and flux plate together on the shim;
   positioning an adhesive material between the flux plate and the housing;
   pressing the housing down over the magnet assembly until the reference surface contacts the work surface;
   allowing the adhesive material to set, to secure the magnet assembly at a preselected distance from the reference surface; and
   then securing an additional flux plate against the reference surface, to obtain a gap of preselected length.

7. A method of assembling a motor having a housing, a magnet assembly, and an inner magnetic flux plate, said method comprising the steps of:
   forming a reference surface on an open end of said housing;
   forming the inner flux plate to include projecting yieldable portions such that the outer dimensions of the flux plate exceed the inner dimensions of the housing;
   securing the inner flux plate and magnet assembly together;
   inserting the inner flux plate and magnet assembly in the housing;
   pressing the inner flux plate and magnet assembly into the housing until the magnet assembly is positioned at a predetermined distance beyond the reference surface; and
   securing an outer flux plate to the reference surface, to obtain a gap of length equal to the predetermined distance.

8. A method as set forth in claim 7, wherein said pressing step includes:
   placing a precision shim having the same thickness as the predetermined distance on a flat work surface;
   placing the magnet assembly and inner flux plate on the shim;
   placing an adhesive material between the inner flux plate and the housing; and
   pressing the housing down around the magnet assembly until the reference surface contacts the work surface.

9. A method as set forth in claim 7, wherein said pressing step includes:
pressing said magnet assembly with a tool having a first surface for contacting the magnet assembly only, and a second surface for contacting the reference surface only, wherein the first and second surfaces are spaced apart by the predetermined distance desired for the gap length.

* * * * *